Feb. 24, 1953
F. AUDINO
2,629,551
METHOD OF OPERATING CONTROLS FOR HOT WATER TANKS OR URNS
Original Filed July 17, 1948
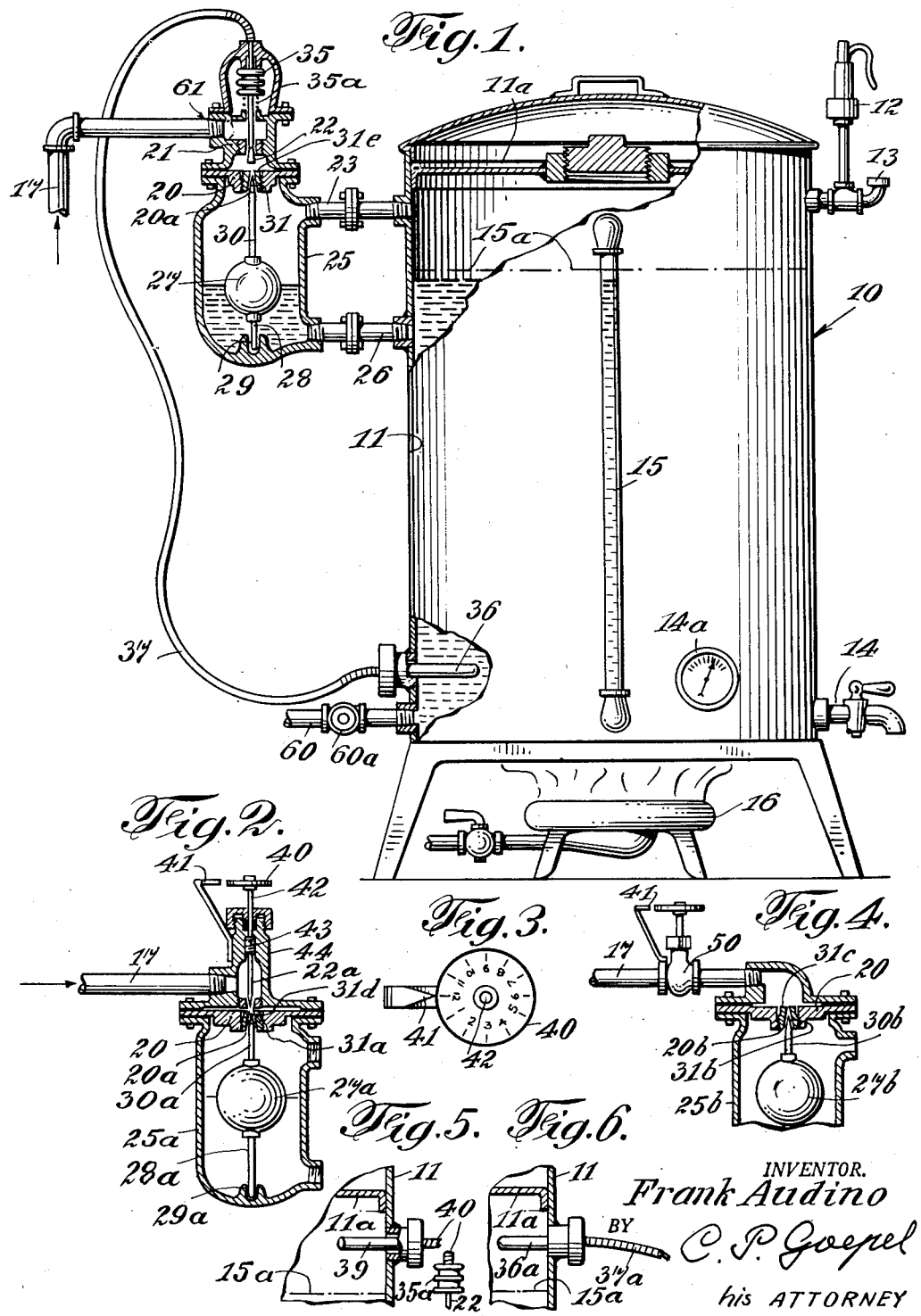

Patented Feb. 24, 1953

2,629,551

UNITED STATES PATENT OFFICE 2,629,551

METHOD OF OPERATING CONTROLS FOR HOT WATER TANKS OR URNS

Frank Audino, Jackson Heights, N. Y.

Original application July 17, 1948, Serial No. 39,318. Divided and this application November 1, 1949, Serial No. 124,846

1 Claim. (Cl. 236—12)

This invention relates to methods of operating controls for hot water tanks or urns such as used in kitchens or pantries or food dispensing counters to supply boiling water to the coffee making urn, or to tea vessels.

Heretofore, after a large demand for hot water had been supplied, the new supply of cold water to the tanks reduced the temperature of the remaining hot water to such an extent that it required some time for the burner to bring the contents up to the necessary high temperature. Also, it sometimes happened that it was overlooked to close the main supply pipe valve and an overflow resulted.

At the present time most restaurants use a coffee urn and a hot water urn, the latter having at least double, and some times three or four times, the contents or volumetric capacity of the coffee urn. The idea is to keep the water boiling in the hot water urn, and to draw it from there when it is necessary to make tea or coffee. The problem is to keep the water in the hot water urn boiling at all times. This is difficult when large quantities of water are drawn out to make coffee.

If, to take a usual case, the coffee urn has a four gallon capacity and the hot water urn has a fifteen gallon capacity, and four gallons of hot water are drawn off to make coffee it is necessary to replace the water drawn off with cold water. If this is done too rapidly, the temperature of the water in the hot water urn drops below the boiling point, and a considerable period of time elapses before it begins to boil again. Since for tea making, water is taken directly from the hot water urn, during this period it is impossible to obtain suitable water for tea.

Sometimes more than one coffee urn is used in conjunction with one such hot water urn. This necessitates a frequent drawing off of hot water and, in turn, the frequent replacement by cold water, so that, particularly during rush periods, the water in the hot water urn is frequently far below the boiling point and, when it is most needed, there is no boiling water to make tea or to make new coffee.

Even if the cold water is replaced in small quantities at a time, the problem is still present. This latter method, likewise, requires constant attention from one of the kitchen employees who, during the rush periods, is usually busy with other matters. As a result, what frequently happens is that after the hot water is drawn off, the cold water supply valve is turned on and the employee walks away to go back to his other duties while the water is running into the hot water urn. Because of the pressure of his other duties he will frequently be unable, or forget, to turn off the cold water, with the result that there will be an overflow with water running all over the kitchen floor. Or, too much cold water will be added at once, thus dropping the temperature in the hot water urn too far below boiling point.

This invention consists in subjecting a body of heated water under atmospheric pressure, with a fixed upper level to a substantially constant heat input, diminishing quantitatively said body of water by a periodic discharge from said urn at its lower end lowering said level in said container, simultaneously subjecting said upper level of said diminished body of water after any such periodic discharge diminishment to a periodic fresh water input in quantities proportioned to the rate of said heat input to the diminished body of water, and continuing said water input until the level of said body of water returns to said fixed upper level, whereby the added fresh water temperature is raised to said diminished body of water temperature by its descent in the diminished body of hot water and by said continuing constant heat input, without substantially lowering the temperature of the lower portion of said body of water at its discharge, the temperature of which fresh water after such addition of said fresh water, is maintained substantially within the temperature of the undiminished body of water, with the boiling point as the upper limit, while being periodically discharged.

The invention will be more fully described hereinafter, embodiments thereof shown in the drawings, and the invention will be finally pointed out in the claim.

In the accompanying drawings,

Fig. 1 is a side view partly in section of a water tank with my improvements embodied therein;

Fig. 2 is a central section of a modified form of valve;

Fig. 3 is a top view of the needle valve of Fig. 2;

Fig. 4 is a central section of another modified form;

Fig. 5 is a diagrammatic partial view of an alternative use; and

Fig. 6 is a diagrammatic partial view of another alternative.

Similar characters of reference indicate corresponding parts throughout the various views.

Referring to the drawings, the usual hot water urn 10, now in general use, consists of a large container 11 having a safety valve 12, a vent 13, a draw off cock or faucet 14, a thermometer 14a, and a liquid level gauge 15 for indicating level of water inside the urn (the dot dash line 15a showing the normal maximum level). The urn 10 is set over a stove or other source of heat 16. Cold water may be fed into the urn directly from the city water supply line when connected with pipe 60 controlled by valve 60a.

The invention consists in an intermediate structure between the pipe 17, connected with the water supply line, and the urn 10, which structure has a needle valve stem 22 working in a body or casing 21 leading into the head 20 with a valve port 20a. A float 27 having a lower guide rod 28 seated in a guide 29 on the bottom of the casing 25, has an upper guide rod 30 with its tapered upper end 31 acting as a valve to open or close the valve port 20a. Connecting pipe 26 leads the water into the urn container 11, while connecting pipe 23 serves to vent the casing 25.

The needle valve stem 22, preferably, is controlled by a bellows 35, which bellows may be actuated in several distinct ways as shown. The thermostatic element 36 may be placed within the hot water in the container 11, and the element 36 connected by a flexible capillary tubing 37 would actuate bellows 35, or alternately, the thermostatic element may be placed in the steam space above the water level as shown by 36a in Fig. 6, namely in the space between the water level indicated by 15a, and the top 11a of the container 11. Such a thermostatic assembly employing a bulb for a thermostatic element 36, a bellows 35, and connecting capillary tubing 37 is known. Thermostatic control of the valve stem 22 may also be accomplished by other known means, as electrical methods not shown, or other existing methods known to the arts, since the details of such control are not the essence of the invention. Instead of a thermostatic element 36 or 36a, the container 11 itself can be utilized for this purpose by connecting the steam space above the water level 15a to the bellows 35a by means of a steam conduit 39 and flexible tube 40 as shown in Fig. 5. The conduit 39 may be omitted and the water then may flow directly into the tube 40.

After the heat is turned on and the water in the urn brought to a boiling point, the thermostatic valve is open. Subsequently, whenever water is drawn off at 14, the incoming cold water enters the valve assembly at the inlet connection, and its flow is regulated by the needle valve stem 22. The cold water continues to flow into the top of the urn until shut off by the float valve when the water reached the maximum water level 15a. At that point, no water can flow into the urn until the float valve port 20a is again opened by the drawing off of more boiling water at 14. By regulating the needle valve stem 22 so that the water flow is limited, the water in the urn is never permitted to drop much below the boiling temperature and then only for short periods of time.

A modified form of structure is shown in Figs. 2 and 3. Here the needle valve is manually controlled (instead of by a thermostat of steam pressure) by a graduated hand wheel 40 and indicating finger 41. The wheel 40 is on a shaft 42 screwthreaded at 43 to engage a screwthread in the bore of the casing 44. The needle valve stem 22a engages its port, when closed, and the float 27a has a lower rod 28a guided by the guide 29a, and an upper rod 30a having a tapered end 31a for closing its port in the head 20. A casing 25a functions like casing 25 in Fig. 5.

In Fig. 4 another embodiment is shown. The casing 25b contains the float 27b with its upper rod 30b having its tapered end 31b engaging the port 20b in the head 20. The screwthreaded insert 31c with its conical orifice is like the insert 31d of Fig. 2 and like the insert 31e of Fig. 1. In Fig. 4, the needle valve 50 is mounted separately in the cold water supply line 17.

The foregoing invention provides means to make the replacement of the water an entirely, or almost entirely, mechanical operation, insuring a constant flow of cold water into the hot water urn until it reaches the maximum water level, but so slowly as not to drop the temperature too far below the boiling point at any time. In order to place this unit into operation it is only necessary to bring the contents up to the boiling point (or other desired operating temperature) by means of the stove. After that whenever hot water is drawn, cold water will automatically run in, slowly, until the maximum water level is again reached, at which time it will shut off automatically. Because the water feeds in slowly it is thus possible to keep the water at boiling or near boiling temperature at all times.

The method described will maintain a constant quantity of boiling water available at all times in the hot water urn for the making of tea or coffee and at the same time will operate automatically eliminating any attention on the part of the employees in the kitchen.

The herein before described method of filling hot water urns during the use thereof consists in subjecting a body of hot water under heat input to periodic discharges, and to a periodic supply of cold water proportioned to the heat input to the hot water, whereby the hot water temperature is maintained substantially constant.

The invention contemplates also the supply and use to an urn of an attachment to the known urns. This attachment consists of the combined float and needle valve with the thermostat or the like and the necessary piping.

This is a divisional of my pending patent application Serial No. 39,318, filed on July 17, 1948.

I wish it to be understood that I do not desire to be limited to the exact details of construction shown and described, for obvious modifications will occur to a person skilled in the art.

I claim:

The herein before described method of replenishing hot water urns during the use thereof, which consists in subjecting a body of heated water under atmospheric pressure, with a fixed upper level to a substantially constant heat input, diminishing quantitatively said body of water by a periodic discharge from said urn at its lower end lowering said level in said container, simultaneously subjecting said upper level of said diminished body of water after any such periodic discharge diminishment to a periodic fresh water input in quantities proportioned to the rate of said heat input to the diminished body of water, and continuing said water input until the level of said body of water returns to said fixed upper level, whereby the added fresh water temperature is raised to said diminished body of water temperature by its descent in the diminished body of hot water and by said continuing constant heat input, without substantially lowering the temperature of the lower portion of said body of water at its discharge, the temperature of which fresh water after such addition of said fresh water is maintained substantially within the temperature of the undiminished body of water, with the boiling point as the upper limit, while being periodically discharged.

FRANK AUDINO.

REFERENCES CITED

The following references are of record in the file of this patent:

UNITED STATES PATENTS

| Number | Name | Date |
|---|---|---|
| 775,021 | Waterman | Nov. 15, 1904 |
| 979,507 | Jones | Dec. 27, 1910 |
| 1,082,212 | Pollard | Dec. 23, 1913 |
| 1,101,428 | Gamble | June 23, 1914 |
| 1,382,569 | Tait | June 21, 1921 |
| 1,545,938 | Bren | July 14, 1925 |
| 1,780,996 | Carroll | Nov. 11, 1930 |
| 2,432,546 | Tanner | Dec. 16, 1947 |